US012806986B2

(12) United States Patent
Kaneko et al.

(10) Patent No.: US 12,806,986 B2
(45) Date of Patent: Nov. 24, 2026

(54) ELECTRIC AUTOMOBILE

(71) Applicant: MAZDA MOTOR CORPORATION, Hiroshima (JP)

(72) Inventors: Naoki Kaneko, Aki-gun (JP); Masanori Mochizuki, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 204 days.

(21) Appl. No.: 18/908,543

(22) Filed: Oct. 7, 2024

(65) Prior Publication Data

US 2025/0115110 A1 Apr. 10, 2025

(30) Foreign Application Priority Data

Oct. 10, 2023 (JP) ................................ 2023-175055

(51) Int. Cl.
*B60K 1/04* (2019.01)
*B60L 50/60* (2019.01)
*H01M 50/249* (2021.01)

(52) U.S. Cl.
CPC ................ *B60K 1/04* (2013.01); *B60L 50/66* (2019.02); *H01M 50/249* (2021.01); *B60K 2001/0422* (2013.01); *H01M 2220/20* (2013.01)

(58) Field of Classification Search
CPC ... B60K 1/04; B60K 2001/0422; B60L 50/66; H01M 50/249; H01M 2220/20
See application file for complete search history.

(56) References Cited

U.S. PATENT DOCUMENTS

2013/0001266 A1* 1/2013 Lucas ...................... B60N 2/36 224/495
2014/0338997 A1* 11/2014 Okada ................ B62D 25/2036 180/68.5
2017/0050685 A1 2/2017 Seo
2020/0238808 A1* 7/2020 Hung ....................... B60N 2/01
2022/0314774 A1 10/2022 Toda et al.
2024/0308394 A1* 9/2024 Takai ..................... B60N 3/042

FOREIGN PATENT DOCUMENTS

DE 10 2012 007 875 A1 10/2013
JP 2008-155828 A 7/2008
JP 2011-195056 A 10/2011

OTHER PUBLICATIONS

The extended European search report issued by the European Patent Office on Mar. 13, 2025, which corresponds to European Patent Application No. 24205558.0—1009 and is related to U.S. Appl. No. 18/908,543.

* cited by examiner

*Primary Examiner* — Edwin A Young
(74) *Attorney, Agent, or Firm* — Studebaker Brackett PLLC

(57) ABSTRACT

An electric automobile, in which a driver's seat and an assistant driver's seat are provided in line in a vehicle width direction. The electric automobile includes an assistant-driver's-seat side battery installed on a vehicle forward side of the assistant driver's seat, a motor operative to drive a driving wheel when receiving supply of electric power from the assistant-driver's-seat side battery, and a battery-moving device to move the assistant-driver's-seat side battery in a vehicle longitudinal direction and/or in the vehicle width direction.

9 Claims, 8 Drawing Sheets

ELECTRIC AUTOMOBILE

BACKGROUND OF THE INVENTION

The present invention relates to an electric automobile comprising a motor to drive a driving wheel and a battery to supply electric power to the motor.

In the electric automobile with the motor to drive the driving wheel, the traveling distance is greatly affected by the installation quantity of the battery to supply the electric power to the motor. In a case of an electric automobile disclosed in Japanese Patent Laid-Open Publication No. 2011-195056, for example, a battery is installed in a tunnel portion formed at a floor panel and also below a rear seat, thereby increasing the installation quantity of the battery. Since the battery installed in the tunnel portion of the floor panel is elongated in a longitudinal direction because of a longitudinally-long shape of the tunnel portion, the size, in a vertical direction, of a front-end portion of the battery is longer than that, in the vertical direction, of a middle portion (longitudinally middle portion) of the battery. Meanwhile, since the rear seat is long in a lateral direction, the battery installed below the rear seat is designed such that it has a laterally-long shape so as to enlarge the battery volume (capacity).

Further, Japanese Patent Laid-Open Publication No. 2008-155828 discloses a structure in which a protrusion portion is formed at a portion of a floor panel which is positioned on an assistant-driver's-seat side (passenger-seat side) and a battery is arranged inside the protrusion portion.

Herein, it is important to reduce the yaw moment of inertia of the vehicle when considering the kinetic performance of the automobile, so that it will be a key issue how to reduce the yaw moment of inertia of the vehicle. Therefore, a layout of a heavy object has been an important factor in designing the automobile.

In general, there may be cases where a driver is only on the vehicle or any other passenger than the driver is also on the vehicle. For example, between a case where a passenger is seated in an assistant driver's seat in addition to the driver and another case where there is no passenger seated in the assistant driver's seat, there exists a weight difference by one person between these cases. This lateral weight difference (imbalance) of the vehicle may cause a big change in the yaw moment of inertia of the vehicle, thereby possibly affecting the kinetic performance of the vehicle.

This change of the yaw moment of inertia may be also caused by the weight difference of the drivers seated in the driver's seat, the longitudinal siting position of the driver in the seat, or the like, so that the kinetic performance of the vehicle may be affected by these factors as well.

Further, there is a case where it becomes important how to set the longitudinal weight balance or the lateral weight balance, which may affect the steering characteristics, in the traveling of the automobile, particularly in the sports-mode traveling. Moreover, some driver may want change the longitudinal weight balance or the lateral weight balance of the vehicle for the driver's own preference or adjusting to the traveling road's condition. However, if some heavy object is additionally installed in order to satisfy such needs, the vehicle weight increases improperly, so that there is a concern that the kinetic performance of the vehicle may be deteriorated.

SUMMARY OF THE INVENTION

The present invention has been devised in view of the above-described matters, and an object of the present invention is to provide an electric automobile which can properly adjust the weight balance of the vehicle by using the battery installed on the side of the assistant-driver's-seat side of the electric automobile.

The present invention is an electric automobile, in which a driver's seat and an assistant driver's seat are provided in line in a vehicle width direction, comprising an assistant-driver's-seat side battery installed on a vehicle forward side of the assistant driver's seat, a motor operative to drive a driving wheel when receiving supply of electric power from the assistant-driver's-seat side battery, and a battery-moving device to move the assistant-driver's-seat side battery in a vehicle longitudinal direction and/or in the vehicle width direction.

According to the present invention, since the assistant-driver's-seat side battery to supply the electric power to the motor is a heavy object, the longitudinal weight balance or the lateral weight balance of the vehicle can be adjusted by moving the assistant-driver's-seat side battery by means of the battery-moving device. It becomes possible by this adjustment to properly set the weight balance depending on existence or non-existence of the passenger seated in the assistant driver's seat, the weight of the driver seated in the driver's seat, or the like. Moreover, achieving of the driver's own preference regarding the steering characteristics, setting of the weight balance according to the traveling road's condition, or the like become possible as well.

In the present invention, the electric automobile may further comprise a tunnel portion provided at a central portion, in the vehicle width direction, of a floor panel, protruding upward, and extending in the vehicle longitudinal direction and a center battery installed in the tunnel portion and operative to supply the electric power of the motor.

According to this structure, the gravity center of the vehicle can be close to the center of the vehicle by providing the center battery, prolonging the traveling distance of the vehicle, so that the yaw moment of inertia of the vehicle can be reduced.

In the present invention, the battery-moving device may comprise a load detection sensor to detect a load applied to the driver's seat by a passenger seated in the driver's seat, a calculation portion to calculate a target position of the assistant-driver's-seat side battery based on the load detected by the load detection sensor, and a moving mechanism to move the assistant-driver's-seat side battery such that the assistant-driver's-seat side battery is located at the target position calculated by the calculation portion.

According to this structure, the best (most appropriate) position of the assistant-driver's-seat side battery is automatically calculated as the target position according to the weight of the driver seated in the driver's seat. Then, the assistant-driver's-seat side battery is moved to the best position, so that the yaw moment of inertia of the vehicle can be reduced properly without any particular adjustment or operation by the driver.

In the present invention, the battery-moving device may comprise a position detection sensor to detect a position, in a vehicle longitudinal direction, of the driver's seat, a calculation portion to calculate a target position of the assistant-driver's-seat side battery based on the position detected by the position detection sensor, and a moving mechanism to move the assistant-driver's-seat side battery such that the assistant-driver's-seat side battery is located at the target position calculated by the calculation portion.

In general, since the driver's seat is configured such that its longitudinal position is adjustable, the longitudinal weight balance of the vehicle changes depending on the longitudinal direction of the driver's seat. Herein, according to the above-described structure, the best (most appropriate) position of the assistant-driver's-seat side battery is automatically calculated as the target position according to the longitudinal position of the driver's seat. Then, the assistant-driver's-seat side battery is moved to the best position, so that the yaw moment of inertia of the vehicle can be reduced properly by merely adjusting the position of the driver's seat without any particular adjustment or operation by the driver.

In the present invention, the battery-moving device may comprise a rail fixed to a floor panel and extending in the vehicle longitudinal direction or in the vehicle width direction and a movable member guided by the fixed rail in a state of engaging with the fixed rail. In this case, the assistant-driver's-seat side battery can be attached to the movable member.

According to this structure, since the assistant-driver's-seat side battery is attached to the floor panel via the movable member and the fixed rail, the installation position of the assistant-driver's-seat side battery becomes low, so that the level (height) of the gravity center of the vehicle can be properly low.

In the present invention, an upper-end portion of the assistant-driver's-seat side battery may be located at a lower level than an upper face of a front-end portion of a cushion portion of the assistant driver's seat.

According to this structure, the assistant-driver's-seat side battery may not contact easily a back face of a thigh portion of the passenger seated in the assistant driver's seat or the like, so that the comfortableness of the passenger seated in the assistant driver's seat can be improved.

The present invention will become apparent from the following description which refers to the accompanying drawings.

DETAILED DESCRIPTION OF THE INVENTION

Figure 1:
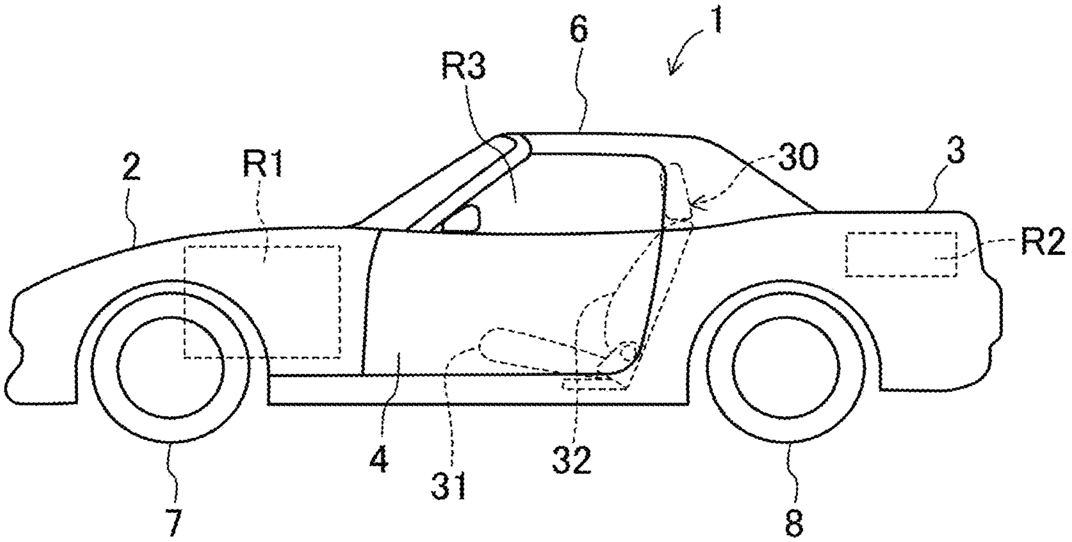
FIG. 1 is a left-side view of an electric automobile according to an embodiment of the present invention.

Hereafter, an embodiment of the present invention will be described specifically referring to the drawings. Herein, the embodiment described below is just an exemplified one of the present invention, and therefore it does not to intend to restrict any application or use of the present invention.

Figure 2:
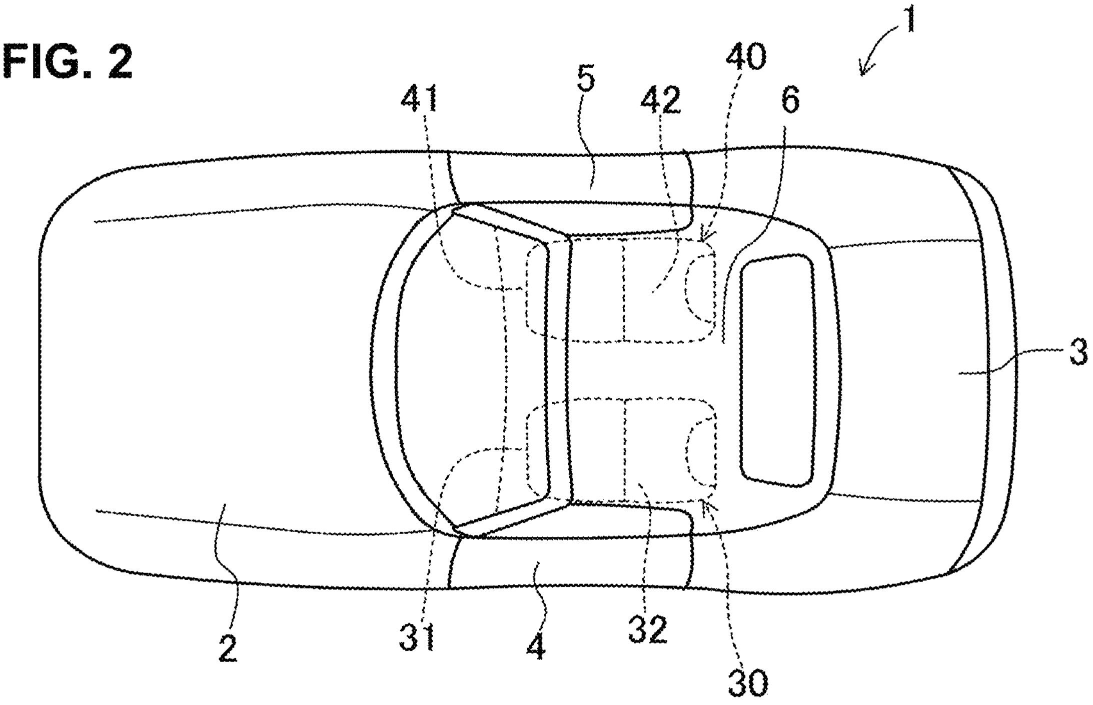
FIG. 2 is a plan view of the electric automobile according to the embodiment of the present invention.

FIGS. 1 and 2 respectively show an exterior of an electric automobile 1 which is provided with a vehicle-body structure A according to the embodiment of the present invention. In the description of the present embodiment, a vehicle forward side will be just referred to as the "front (forward) side," a vehicle rearward side will be just referred to as the "rear (rearward) side," a vehicle leftward side will be just referred to as the "left (leftward) side," and a vehicle leftward side will be just referred to as the "left (left) side." A lateral direction of the vehicle corresponds to (matches) a vehicle with direction. A side view of the vehicle means a view of the vehicle when the electric automobile 1 is viewed from the left side or the right side. Further, a view of the vehicle when the electric automobile 1 is viewed from an upper side means a top view or a plan view of the vehicle.

The electric automobile 1 is a passenger car, for example, and may be any type of vehicle, such as a coupe type, a hatch-back type, or a sedan type. The electric automobile 1 has a hood (bonnet hood) 2 at its front side. A front-side baggage loading space R1 where baggage can be loaded (illustrated by a broken line in FIG. 1 only) is provided below the hood 2. The front-side baggage loading space R1 is opened by opening the hood 2, so that the baggage can be loaded or unloaded.

A rear hood 3 is provided at a rear side of the electric automobile 1. Below the rear hood 3 is provided a rear-side baggage loading space R2 where baggage can be loaded (illustrated by a broken line in FIG. 1 only). The rear-side baggage loading space R2 is opened by opening the rear hood 3, so that the baggage can be loaded or unloaded. Herein, either one or both of the front-side baggage loading space R1 and the rear-side baggage loading space R2 may be set as a space for arranging an auxiliary device therein.

A left-side door 4 and a right-side door 5 are provided to be openable at a left-side portion and a right-side portion of the electric automobile 1. The roof 6 may be a fixed type, a detachable type, or a foldable type. In a case of the detachable type of the holdable type, the vehicle is an open car with no top above a passenger.

The vehicle-body structure A of the electric automobile 1 is equipped with front wheels 7 and rear wheels 8, and a motor M for driving the rear wheels 8 (shown in FIGS. 4 and 5 and hereafter, referred to as the "motor M" simply) is provided. An inverter circuit and various sensors which are necessary for controlling the motor M, devices for driving operation, and others can be used from any conventionally well-known ones.

While the rear wheel 8 is the driving wheel in the present embodiment, the front wheel 7 may be set as the driving wheel, or both of those 7, 8 may be set as the driving wheels. That depends on how the motor M is arranged. That is, in a case where the motor M is installed at the rear side of the vehicle only, the rear wheel 8 can be the driving wheel, and also in a case where the motor M is installed at the front side of the vehicle only, the front wheel 7 can be the driving wheel. Further, in a case where the plural motors M are installed at the front side and the rear side of the vehicle, the both of the wheels 7, 8 can be the driving wheel. Hereinafter, the case where the motor M is installed at the rear side of the vehicle only will be described.

Figure 4:
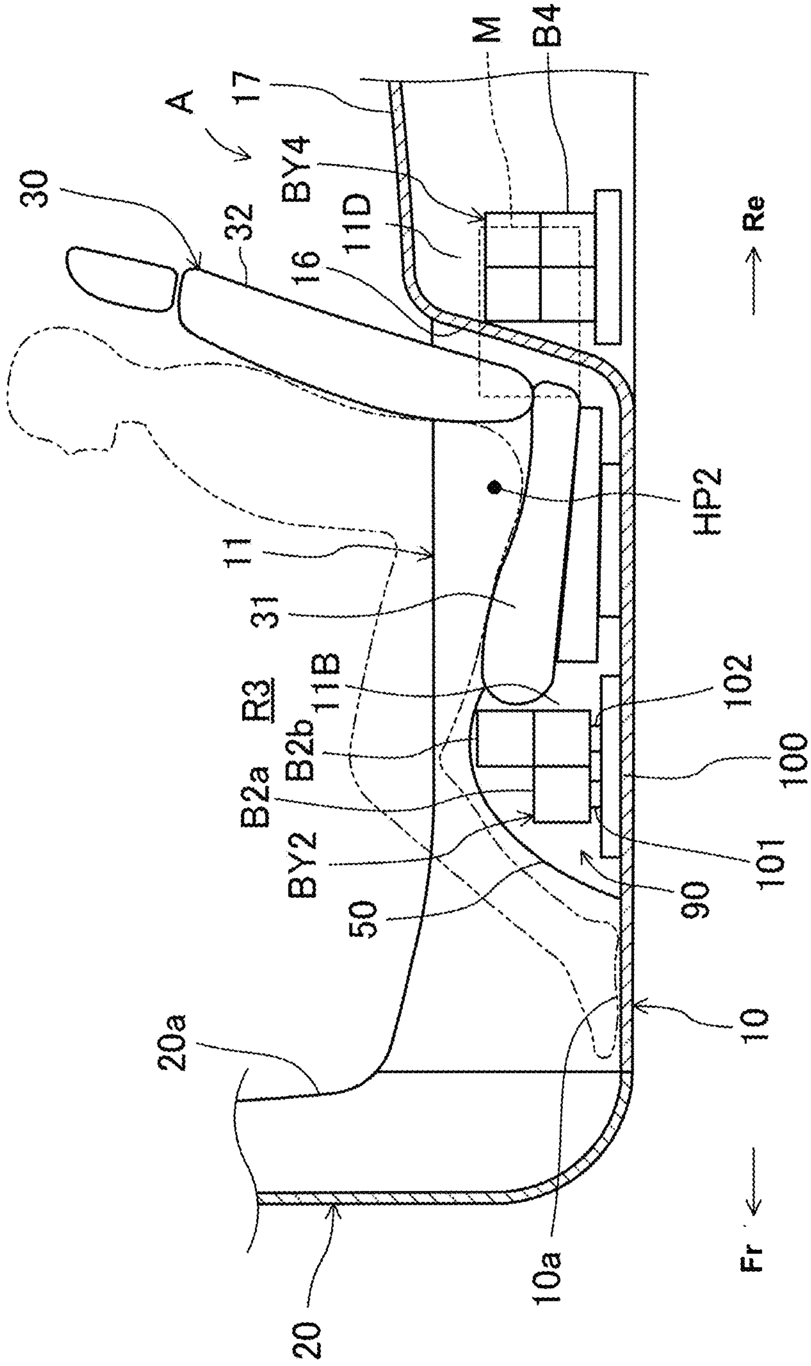
FIG. 4 is a sectional view taken along line IV-IV of FIG. 3.

As shown in FIG. 1, a cabin R3 as a space for passengers is provided between the front wheels 7 and the rear wheels 8. As shown in FIG. 4, the vehicle-body structure A of the electric automobile 1 comprises a floor panel 10 which forms a floor face of the cabin R3 and a dash panel 20 which forms a front wall of the cabin R3. Further, the vehicle-body structure A comprises an inclined panel 16 which extends obliquely upward-and-rearward from a rear-end portion of the floor panel and a rear panel 17 which extends rearward from an upper-end portion of the inclined panel 16.

Figure 3:
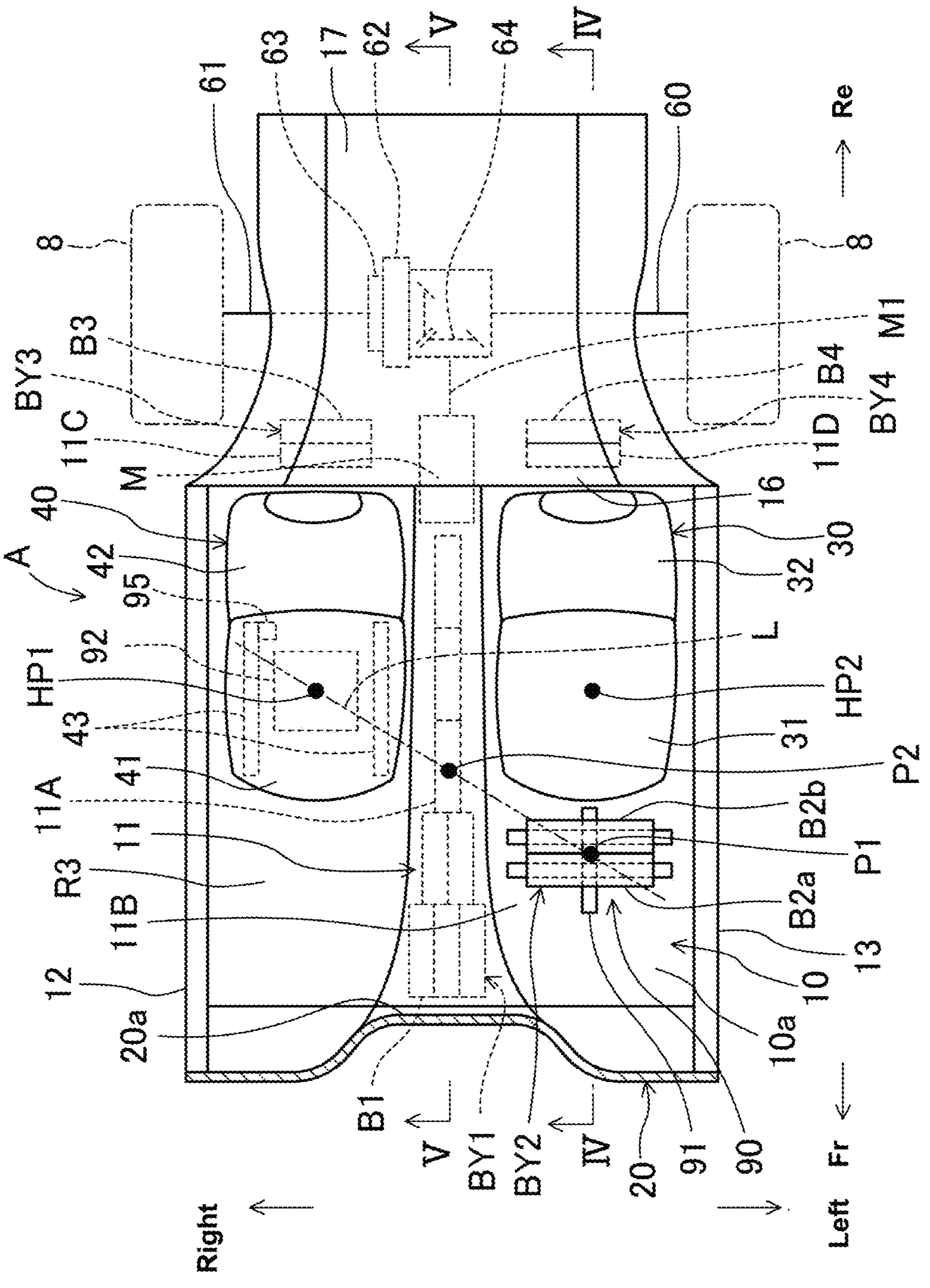
FIG. 3 is a plan view showing a cabin in a state where a roof, a door, an interior material and others of the electric automobile are omitted.

A tunnel portion 11 which protrudes upward and extends in a longitudinal direction is formed at a central portion, in a vehicle width direction, of the floor panel 10. Respective cabin-side faces of the tunnel portion 11, the floor panel 10, and the dash panel 20 are covered with an interior material, not illustrated. As shown in FIG. 3, the vehicle-body structure A further comprises a right-side side sill 12 which extends in the longitudinal direction along a right edge portion of the floor panel 10 and a left-side side sill 13 which extends in the longitudinal direction along a left edge portion of the floor panel 10.

A front-end portion of the tunnel portion 11 is positioned at a front-end portion of the floor panel 10, and a rear-end portion of the tunnel portion 11 is positioned at a rear-end portion of the floor panel 10. Accordingly, the tunnel portion 11 is continuous from the front-end portion to the rear end of the floor panel 10.

This electric automobile 1 is right-hand drive. Therefore, the vehicle-body structure A is equipped with an assistant driver's seat 30 as a left-side seat and a driver's seat 40 as a right-side seat, which are respectively provided on a left side and a right side of the tunnel portion 11 formed at the floor panel 10. Specifically, the assistant driver's seat 30 is arranged on the left side of the tunnel portion 11 at the floor panel 10, and this assistant driver's seat 30 is disposed between the tunnel portion 11 and the left-side side sill 13. The driver's seat 40 is arranged on the right side of the tunnel portion 11 at the floor panel 10, and this driver's seat 40 is disposed between the tunnel portion 11 and the right-side side sill 12. Accordingly, the assistant driver's seat 30 and the driver's seat 40 are provided side by side in the vehicle width direction, interposing the tunnel portion 11 therebetween. Herein, the electric automobile 1 may be left-hand drive, and in this case, the driver's seat 40 may be provided at the left side and the assistant driver's seat 30 may be provided at the right side. Further, a rear seat may be provided as well.

The driver's seat 40 comprises a cushion portion 41 which mainly supports a buttock portion and a thigh portion of the passenger and a back portion 42 which extends upward from a rear end portion of the cushion portion 41 and mainly supports a waist portion, a back portion, and shoulder portions of the passenger. The cushion portion 41 forms a sitting face of the driver's seat 40. The cushion portion 41 is attached to the floor panel 10 via a slide mechanism 43 (shown in FIG. 3 only), which is not indispensable. A slide mechanism 43 is a mechanism to position (fix) the driver's seat 40 at any needed position by moving the driver's seat 40 in the longitudinal direction. This slide mechanism 43 is well known.

Likewise, the assistant driver's seat 30 comprises a cushion portion 31 and a back portion 32. In FIG. 3, a hip point of the passenger seated in the driver's seat 40 is denoted by a reference character HP1, and a hip point of the passenger seated in the assistant driver's seat 30 is denoted by a reference character HP2. Herein, while it is assumed that the passenger seated has a standard body size and weight, each position of the hip points HP1, HP2 does not move so much even when the body size and weight of the passenger changes. In FIG. 4, the hip point of the passenger seated in the assistant driver's seat 30 is denoted by the reference character HP2.

Herein, in a case where the driver's seat 40 is attached to the floor panel 10 such that it is slidable in the longitudinal, the hip point HP1 moves in the longitudinal direction according to its slide position. However, the hip point HP1 where the driver's seat 40 is located at a position where the passenger with the standard body size can take a standard driving position can be made standard. The hip point HP2 on the assistant-driver's-seat 30 side is the same as well. The assistant driver's seat 30 may be fixedly attached to the floor panel 10 without being slidable in the longitudinal direction.

An upper end portion of the tunnel portion 11 is located at a higher level than each upper face of the cushion portions 31, 41. Thereby, a installation space where a center battery unit BY1 described later is installed in the tunnel portion 11 can be securely expanded in a height direction.

Figure 5:
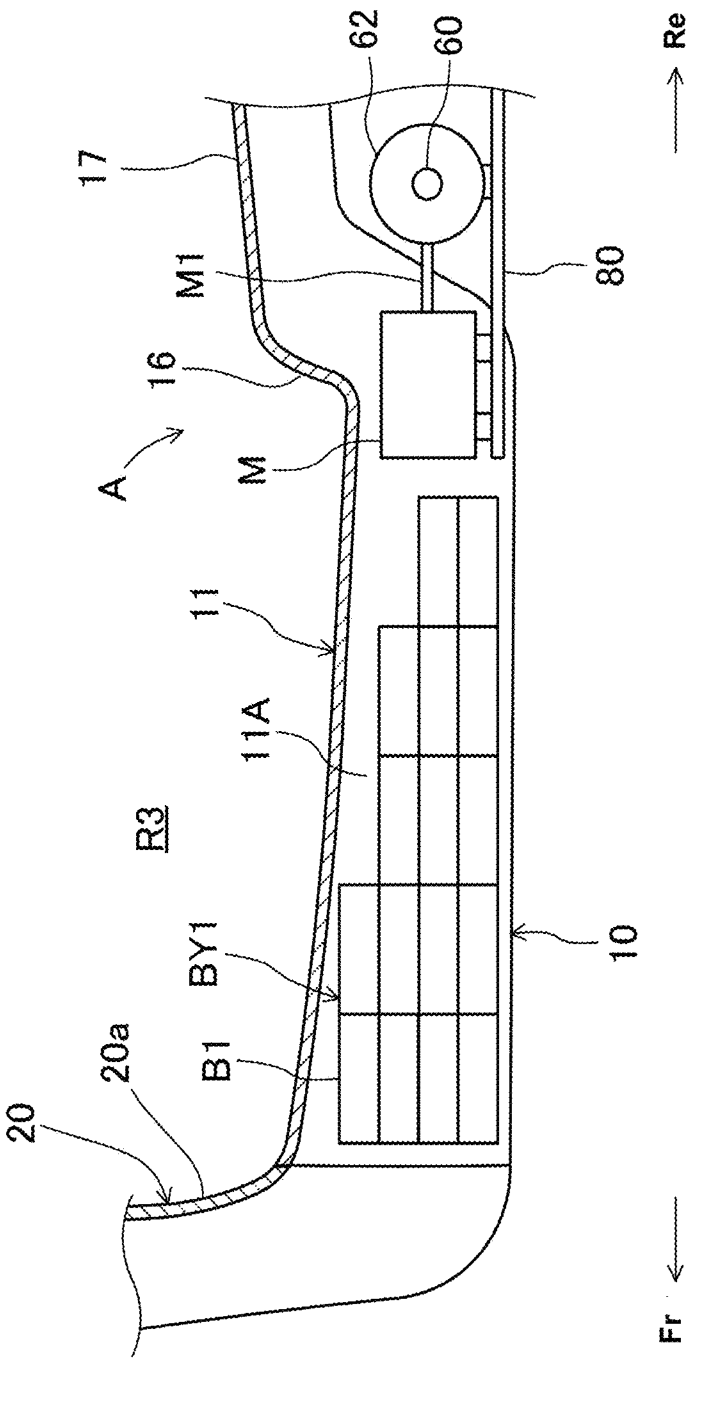
FIG. 5 is a sectional view taken along line V-V of FIG. 3.
Figure 6:
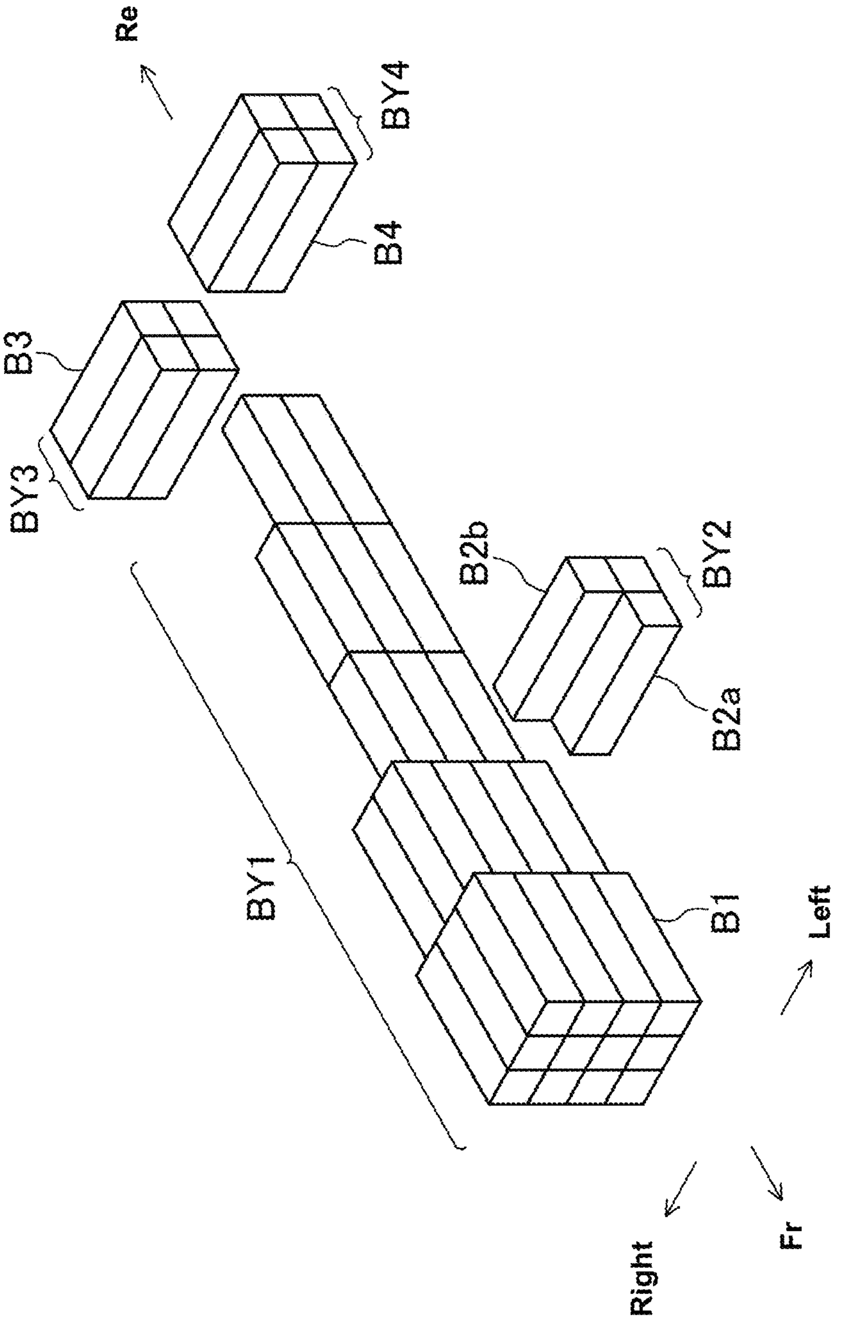
FIG. 6 is a perspective view showing a battery unit installed on a vehicle body only.

As shown in FIGS. 4 and 5, the protrusion height of the tunnel portion 11 from the level of the floor panel 10 (the protrusion height from the level of a portion where the assistant driver's seat 30 and the river's seat 40 are attached) becomes higher while going vehicle forward. Accordingly, the upper end portion of the tunnel portion 11 is inclined gently such that its rear side becomes low. The assistant driver's seat 30 and the driver's seat 40 are positioned beside a rear-side portion of the tunnel portion 11, and the rear-side portion of the tunnel portion 11 overlaps the assistant driver's seat 30 and the driver's seat 40 in a side view. Since the height of the overlapping portion of the tunnel portion 11 with the assistant driver's seat 30 and the driver's seat 40 in the side view becomes low, it becomes possible that the passenger (driver) seated in the driver's seat 40 moves onto the assistant driver's seat 30 beyond the tunnel portion 11, or the passenger seated in the assistant driver's seat 30 moves onto the driver's seat 40 beyond the tunnel portion 11.

Further, as shown in FIG. 3, the width (lateral size) of the tunnel portion 11 becomes wider while going forward. Specifically, the distance between the left-side wall and the right-side wall of the tunnel portion 11 becomes narrower while going rearward, and the width of the rear-side portion of the tunnel portion 11 is narrower than that of a front-side portion of the tunnel portion 11. Since the width of the overlapping portion of the tunnel portion 11 with the assistant driver's seat 30 and the driver's seat 40 in the side view is narrow, the sufficient width of each of the assistant driver's seat 30 and the driver's seat 40 can be secured, suppressing the vehicle width from being improperly wide.

Herein, since the front portion of the tunnel portion 11 is a portion which does not overlap the assistant driver's seat 30 and the driver's seat 40 in the side view, there is no problem in securing the width of the assistant driver's seat 30 and the driver's seat 40 by enlarging the width of the front portion of the tunnel portion 11.

The dash panel 20 extends upward and in the vehicle width direction from the front-end portion of the floor panel 10, and is a member to partition the cabin R3 from its font-side space. A protrusion portion 20*a* which protrudes toward an inside of the cabin R3 is provided at a central portion, in the vehicle width direction, of the dash panel 20. As shown in FIG. 5, a lower-end portion of the protrusion portion 20*a* is continuous to the front-end portion of the tunnel portion 11.

As shown in FIGS. 3-6, the vehicle-body structure A comprises the center battery unit BY1, an assistant-driver's-seat side battery unit BY2, a rear-right side battery unit BY3, and a rear-left side battery unit BY4. In the present embodiment, the plural battery units BY1-BY4 are arranged at various portions of a vehicle body, so that the installation quantity (volume, capacity) of the battery can be increased by utilizing plural spaces formed at the various portions of the vehicle body.

The center battery unit BY1 is installed in the tunnel portion 11. In the tunnel 11, a center-battery arrangement portion 11A to install the center battery unit BY1 is provided to extend in the longitudinal direction, and the center battery unit BY1 arranged at the center-battery arrangement portion 11A is detachably attached to the floor panel 10 or the like (in a replaceable manner). A front-end portion of the center battery unit BY1 in its fixed state to the floor panel 10 or the like is positioned on a rearward side of the dash panel 20. Thereby, any battery as a heavy object does not exist at the front-side portion of the vehicle.

The center battery unit BY1 includes plural batteries (center batteries) B1 which are provided in line along the longitudinal direction, and these batteries B1 supply electric power to the motor M. The motor M drives the rear wheels 8 by receiving the electric power from the center battery unit BY1. The center battery unit BY1 may comprise a battery case to install the center batteries B1, a sensor to detect the temperature of the center batteries B1, a heat exchanger to adjust the temperature of the center batteries B1, and others, which are not illustrated.

The center battery B1 is made of a chargeable/dischargeable secondary battery (battery cell) or the like. However, this battery B1 may be made of a lithium-ion battery, a solid-state battery, or the like. Any other secondary battery is applicable. The center battery B1 may be a so-called battery cell or a battery pack to store battery cells. While the drawings illustrate the center battery B1 in a rectangular-parallelepiped shape, but this is not limited to this shape. Further, the center batteries B1 are all the same.

The motor M drives the rear wheels 8, and therefore it is provided at a rear side of the vehicle body, specifically, on the rearward side of the center battery unit BY1. The center battery unit BY1 is configured such that its weight becomes heavier while being separated from the motor M, i.e., while going forward. For example, as shown in FIG. 3, the center battery unit BY1 is configured such that its width (its lateral size), in the top view, becomes wider while being separated from the motor M. Specifically, the center batteries B1 constituting the center battery unit BY1 are disposed in line in the vehicle longitudinal direction which corresponds to (match) a batteries' longitudinal direction. The foremost-positioned center batteries B1 are arranged such that three of batteries are in line in the vehicle width direction. The second-positioned center batteries B1 are arranged such that two of batteries are in line in the vehicle width direction. The third-positioned, fourth-positioned, and rearmost-positioned center batteries B1 are respectively arranged such that a single line of batteries extends in the longitudinal direction. That is, those batteries B1 are not in line in the vehicle width direction.

Further, the center battery unit BY1 is configured such that the size, in a vertical direction, thereof becomes longer while being separated from the motor M. As shown in FIG. 5, the foremost-positioned center batteries B1 and the second-positioned center batteries B1 are arranged such that four of batteries are in line in the vehicle direction. The third-positioned center batteries B1 and the fourth-positioned center batteries B1 are arranged such that three of batteries are in line in the vehicle direction. The rearmost-positioned center batteries B1 are arranged such that two of batteries are in line in the vehicle direction. The number of the center batteries B1 stacked in the vertical direction can be also called a stack number or a step number.

That is, the center batteries B1 are arranged such that the width of the center battery unit BY1 becomes wider while being separated from the motor M and, that the size, in the vertical direction, of the center battery unit BY1 becomes longer while being separated from the motor M. Accordingly, the front-end portion of the center battery unit BY1 is the heaviest and a rear-end portion of the center battery unit BY1 is the lightest. A middle portion, in the longitudinal direction, of the center battery unit BY1 has a middle weight between the weight of the front-end portion and the weight of the rear-end portion.

The assistant driver's seat 30 and the driver's seat 40 are positioned beside the third-positioned, fourth-positioned and rearmost-positioned center batteries B1 of the center battery unit BY1. Meanwhile, the foremost-positioned and second-positioned center batteries B1 of the center battery unit BY1 are arranged on the forward side of the assistant driver's seat 30 and the driver's seat 40. That is, since the center batteries B1 of the center battery unit BY1 are not arranged in line in the vehicle width direction between the assistant driver's seat 30 and the driver's seat 40, the width of the portion of the center battery unit BY1 where the center batteries B1 are not arranged in line is set to be narrower than that of the portion of the center battery unit BY1 which is positioned on the forward side of the assistant driver's seat 30 and the driver's seat 40. The width of the center battery unit BY1 becomes narrower while going rearward, corresponding to the width of the tunnel portion 11.

Further, the stack (step) number of the foremost-positioned and second-positioned center batteries B1 of the center battery unit BY1 is the most, the stack (step) number of the third-positioned and fourth-positioned center batteries B1 is fewer, and the stack (step) number of the rearmost-positioned center batteries B1 is the fewest. Thereby, the center battery unit BY1 is configured such that its height becomes higher while going forward, corresponding to the protrusion height of the tunnel portion 11.

The number, the longitudinally-arranged number, and the stack number of the center batteries B1 constituting the center battery unit BY1 are not limited to the above-described ones, and any number is applicable. That is, as long as those numbers of the center batteries B1 are appropriately set such that the battery unit BY1 becomes heavier while being separated from the motor M, any number more than two (including two) is applicable as the longitudinally-arranged number and also any number more than one (including one) is applicable as the stack number.

The assistant-driver's-seat side battery unit BY2 is arranged at a portion of the floor panel 10 which is positioned on the forward side of the cushion portion 31 of the assistant driver's seat 30. The assistant-driver's-seat side battery arrangement portion 11B where the assistant-driver's-seat side battery unit BY2 is arranged is provided on the forward side of the assistant driver's seat 30. Specifically, the assistant-driver's-seat side battery unit BY2 is arranged at a rear-side portion of the floor panel 10 which is positioned on the assistant-driver's-seat side, whereas a front-side portion of the floor panel 10 which is positioned on the assistant-driver's-seat side is set as a foot-placement portion 10*a* where feet of the passenger seated in the assistant driver's seat 30 are placed. The passenger having the standard body size seems not to place the passenger's feet just before the cushion portion 31 of the assistant driver's seat, but this passenger tends to place the feet forward away from the cushion portion 31, stretching the passenger's legs. In the present embodiment, since the assistant-driver's-seat side battery unit BY2 does not exist at the portion forward away from the cushion portion 31 and also the foot-placement portion 10*a* is provided, the comfortableness of the passenger seated in the assistant driver's seat 30 can be improved, installing the batteries B2 on the side of the assistant driver's seat 30.

The vehicle-body structure A comprises a battery-moving device 90 to move the assistant-driver's-seat side battery unit BY2 in the longitudinal direction and/or in the vehicle width direction. Details of this battery-moving device 90 will be described later.

A positional relationship of the assistant-driver's-seat side battery unit BY2 and the hip point HP1 of the passenger seated in the driver's seat 40 will be described. While the assistant-driver's-seat side battery unit BY2 is moved in the longitudinal direction and/or in the vehicle width direction by the battery-moving device 90, the following description presupposes that the assistant-driver's-seat side battery unit BY2 is positioned at a center, in the longitudinal direction, of a moving range and also at a center, in the vehicle width direction, of the moving range. The assistant-driver's-seat side battery unit BY2 located at these centers of the moving range is positioned on the forward side of the hip point HP1 of the passenger seated in the driver's seat 40. In FIG. 3, the gravity center of the assistant-driver's-seat side battery unit BY2 is denoted by a reference character P1, whereas the center of the vehicle (in the longitudinal direction and in the width direction) is denoted by a reference character P2. In the plan (top) view, the hip point HP1 of the passenger seated in the driver's seat 40, the vehicle center (P2), and the gravity center (P1) of the assistant-driver's-seat side battery unit BY2 are positioned on an identical liner (straight) line (illustrated by an imaginary line L). This imaginary line L is inclined, in the plan view, such that its rear side is located on the side of the driver's seat 40.

The assistant-driver's-seat side battery unit BY2 includes plural batteries B2*a*, B2*b* like the center batteries B1 which constitutes the center battery unit BY1. These batteries B2*a*, B2*b* are also operative to supply the electric power to the motor M. The assistant-driver's-seat side battery unit BY2 may comprise a battery case, a sensor to detect the temperature of the batteries B2*a*, B2*b*, a heat exchanger to adjust the temperature of the batteries B2*a*, B2*b*, and others. An upper-end portion of the assistant-driver's-seat side battery unit BY2 is located at a lower level than an upper face of the front-end portion of the cushion portion 31 of the assistant driver's seat 30. The assistant-driver's-seat side battery unit BY2 is configured such that its level becomes lower while going forward. Specifically, these two batteries B2*a*, B2*b* in a state where their longitudinal directions match the vehicle width direction are arranged in line in the longitudinal direction, which include the front-side battery B2*a* and the rear-side battery B2*b*. The front-side battery B2*a* is the one-stack (step) battery, and the rear-side battery B2*b* is the two-stack (step) battery. Since the height of the upper-end portion of the front-side battery B2*a* is low, the assistant-driver's-seat side battery unit BY2 may not contact easily a back face of the thigh portion of the passenger seated in the assistant driver's seat 30 when the passenger naturally stretches the passenger's legs. Thereby, the comfortableness of the passenger seated in the assistant driver's seat 30 can be improved.

The front-side battery B2*a* and the rear-side battery B2*b* are covered with a battery cover 50 (shown in FIG. 4 only). The battery cover 50 may be made of a soft material, such as cloth or synthetic leather, or a hard resign material. The battery cover 50 may be a member which constitutes part of the assistant-driver's-seat side battery unit BY2.

The number, the longitudinally-arranged number, and the stack number of the batteries B2*a*, B2*b* constituting the assistant-driver's-seat side battery unit BY2 are not limited to the above-described ones, and any number is applicable. That is, as long as those numbers of the batteries B2*a*, B2*b* are appropriately set such that the height of the assistant-driver's-seat side battery unit BY2 becomes lower while going forward, any number more than two (including two) is applicable as the longitudinally-arranged number and also any number more than one (including one) is applicable as the stack number. The batteries B2*a*, B2*b* may be positioned such that its longitudinal direction matches the vehicle width direction or the vehicle longitudinal direction. Further, the front-side battery B2*a* and the rear-side battery B2*b* may have the same stack (step) number.

As shown in FIGS. 3 and 5, the motor M is attached to a subframe 80 which is provided below a rear portion of the vehicle body, and it is arranged below the inclined panel 16 and the rear panel 17 at a middle portion, in the vehicle width direction, of the vehicle body. The motor M is arranged such that its output shaft M1 extends in the longitudinal direction. In the present embodiment, the output shaft M1 of the motor M projects rearward. A front-side portion of the motor M is arranged in the tunnel portion 11. Thus, since the installation position of the motor M is set to be as forward as possible, the motor M is arranged such that it overlaps at least part of the back portion 32 of the assistant driver's seat 30 in the side view shown in FIG. 4. In the side view, for example, the motor M can be arranged such that a lower-side portion of the back portion 32 and the front-side portion of the motor M overlap each other. Thereby, the motor M can be positioned near the center of the vehicle.

The vehicle-body structure A comprises a left-side drive shaft 60 and a right-side drive shaft 61 which are provided in back of the tunnel portion 11 formed at the floor panel 10 and transmit a rotational force of the motor M to the rear wheels 8 as the driving wheels. The left-side drive shaft 60 and the right-side drive shaft 61 extend in the vehicle width direction. The motor M is provided between the tunnel portion 11 and the left-side and right-side drive shafts 60, 61. Accordingly, the motor M is arranged closer to the central portion, in the longitudinal direction, of the vehicle than the drive shafts 60, 61. Herein, in a case where the motor is provided at the front side and drive the front wheels 7, which is not illustrated, the left-side and right-side drive shafts can be provided in front of the tunnel portion 11.

The vehicle-body structure A further comprises a transmission 62 and a deferential gear box 63. The transmission 62 and the deferential gear box 63 are attached to the sub frame 80. The transmission 62 and the deferential gear box 63 are arranged behind the motor M and on the side of the driver's seat 40 at the vehicle body. The rotational force of the output shaft M1 of the motor M is inputted to the transmission 62 via a gear 64. The rotational force of the output shaft M1 extending in the longitudinal direction is transferred to a rotational force around an axis extending in the vehicle width direction and inputted to the transmission 62. The transmission 62 is a speed-changing gear or a speed-reducing gear. In a case where the transmission 62 is the speed-changing gear, it may be a stepped transmission or a non-stage transmission. The transmission 62 and the deferential gear box 63 may be integrated, or gears to constitute a transmission and gears to constitute a deferential mechanism may be installed in a single gear box. The motor M and the transmission 62 may be modularized. Herein, in a case where the motor M is provided at the front side of the vehicle body and drives the front wheels 7, the transmission 62 and the deferential gear box 63 can be provided in front of the tunnel portion 11, which is not illustrated.

The rotational force of the motor M which is outputted from the transmission 62 is transferred to the right-and-left rear wheels 8 via a deferential mechanism (not illustrated) stored in the deferential gear box 63 and the drive shafts 60, 61.

As shown in FIG. 3, the rear-right side battery unit BY3 is provided behind the driver's seat 40. The inclined panel 16 is positioned in back of the driver's seat 40, and a rear-right side battery arrangement portion 11C where the rear-right side battery unit BY3 can be arranged is provided in back of the inclined panel 16 (outside the cabin R3). The rear-right side battery unit BY3 comprises plural rear-right side batteries B3 like the center batteries B1 constituting the center battery unit BY1. The rear-right side batteries B3 are operative to supply the electric power to the motor M as well. The rear-right side battery unit BY3 may comprise a battery case, a sensor to detect the temperature of the rear-right side batteries B3, a heat exchanger to adjust the temperature of the rear-right side batteries B3, and others.

Further, the rear-left side battery unit BY4 is provided behind the assistant driver's seat 30. The inclined panel 16 is positioned in back of the assistant driver's seat 30, and a rear-left side battery arrangement portion 11D where the rear-left side battery unit BY4 can be arranged is provided in back of the inclined panel 16 (outside the cabin R3). The rear-left side battery unit BY4 comprises plural rear-left side batteries B4 like the center batteries B1 constituting the center battery unit BY1. The rear-left side batteries B4 are operative to supply the electric power to the motor M as well. The rear-left side battery unit BY4 may comprise a battery case, a sensor to detect the temperature of the rear-left side batteries B4, a heat exchanger to adjust the temperature of the rear-left side batteries B4, and others.

The rear-right side battery arrangement portion 11C and the rear-left side battery arrangement portion 11D are provided relatively on the forward side of the transmission 62. The rear-right side battery arrangement portion 11C and the rear-left side battery arrangement portion 11D are further provided on the both sides, in the vehicle width direction, of the motor M. That is, the motor M is arranged between the rear-right side batteries B3 and the rear-left side batteries B4, and also provided such that at least part of the rear-right side batteries B3 and the rear-left side batteries B4 overlap the motor M in the side view. Since the rear-right side batteries B3 and the rear-left side batteries B4 are provided at the both sides, in the vehicle width direction, of the motor M, respectively, these can be called side batteries.

The number, the longitudinally-arranged number, and the stack number of the rear-right side batteries B3 constituting the rear-right side battery unit BY3 can be set arbitrarily. Further, the number, the longitudinally-arranged number, and the stack number of the rear-left side batteries B4 constituting the rear-left side battery unit BY4 can be set arbitrarily as well. The rear-right side batteries B3 and the rear-left side batteries B4 may be arranged such that their longitudinal direction match the vehicle width direction or the longitudinal direction. Further, the rear-right side battery unit BY3 and the rear-left side battery unit BY4 may be detachable.

(Details of Battery-Moving Device)

Figure 7:
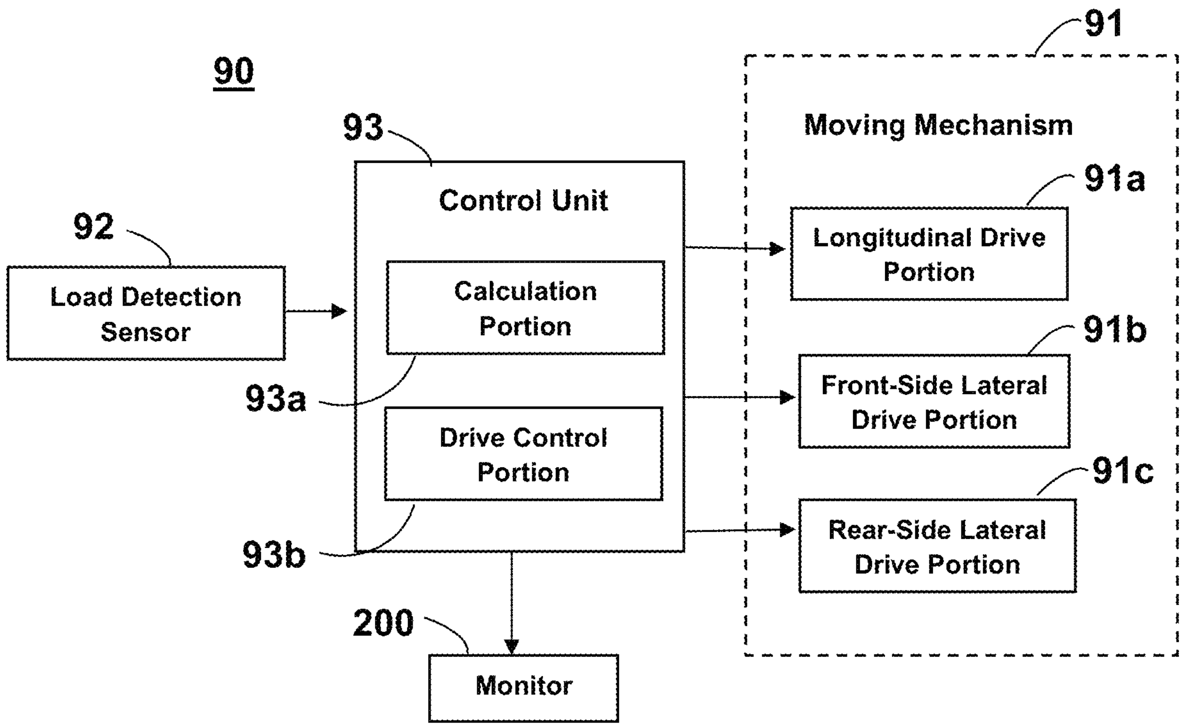
FIG. 7 is a block diagram of a battery-moving device.
Figure 8:
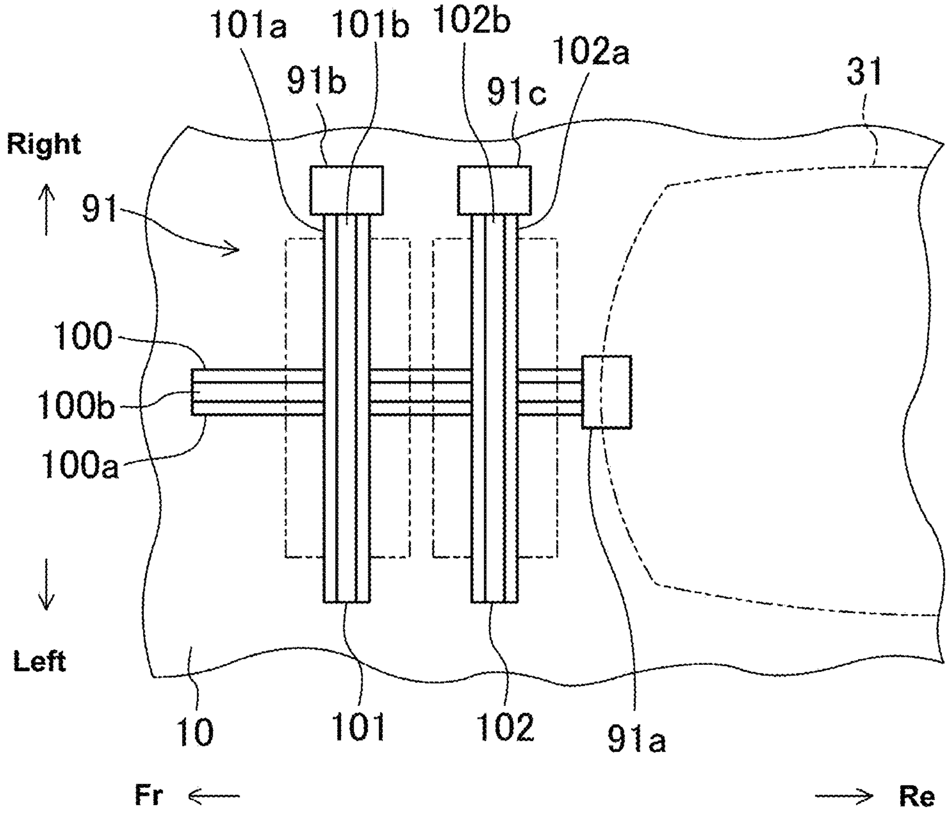
FIG. 8 is a plan view of a moving mechanism.

As shown in FIG. 7, the battery-moving device 90 comprises a moving mechanism 91 to move the batteries B2*a*, B2*b* of the assistant-driver's-seat side battery unit BY2 in the longitudinal direction and/or in the vehicle width direction, a load detection sensor 92, and a control unit 93. The details of the moving mechanism 91 will be described referring to FIG. 8 first.

The moving mechanism 91 comprises a longitudinal guide portion 100 to guide the batteries B2*a*, B2*b* in the longitudinal direction, a front-side lateral guide portion 101 to guide the front-side battery B2*a* in the lateral direction, and a rear-side lateral guide portion 102 to guide the rear-side battery B2*b* in the lateral direction. The longitudinal guide portion 100 comprises a fixed rail 100*a* which is fixed to the floor panel 10 and extends in the longitudinal direction and a movable member 100*b* which is guided in the longitudinal direction by the fixed rail 100*a* in a state of engaging with the fixed rail 100*a*. The movable member 100*b* is configured not to be movable in the vertical direction and in the lateral direction, relative to the fixed rail 100*a*. The number of the longitudinal guide portion 100 may be two or more.

The front-side guide portion 101 comprises a front-side rail 101*a* which is fixed to the movable member 100*b* of the longitudinal guide portion 100 and extends in the lateral direction and a front-side movable member 101*b* which is guided in the lateral direction by the front-side rails 100*a* in a state of engaging with the front-side rail 101*a*. The front-side movable member 101*b* is configured not to be movable in the vertical direction and in the longitudinal direction, relative to the front-side rail 101*a*.

The rear-side guide portion 102 comprises a rear-side rail 102*a* which is fixed to the movable member 100*b* of the longitudinal guide portion 100 and extends in the lateral direction and a rear-side movable member 102*b* which is guided in the lateral direction by the rear-side rails 102*a* in a state of engaging with the rear-side rail 102*a*. The rear-side movable member 102*b* is configured not to be movable in the vertical direction and in the longitudinal direction, relative to the rear-side rail 102*a*.

The front-side battery B2*a* is attached to the front-side movable member 101*b*. The rear-side battery B2*b* is attached to the rear-side movable member 102*b*. That is, since the front-side battery B2*a* and the rear-side battery B2*b* are attached to the movable member 100*b* via the front-side lateral guide portion 101 and the rear-side lateral guide portion 102, respectively, these batteries B2*a*, B2*b* can be moved in the longitudinal direction by the longitudinal guide portion 100. Meanwhile, regarding the lateral direction, the front-side battery B2*a* can be moved by the front-side lateral guide portion 101 and the rear-side battery B2*b* can be moved by the rear-side lateral guide portion 102. Accordingly, the front-side battery B2*a* and the rear-side battery B2*b* can be moved separately.

Herein, the front-side battery B2*a* and the rear-side battery B2*b* may be movable together in the lateral direction. Further, the longitudinal guide portion 100 may be provided only, and the front-side battery B2*a* and the rear-side battery B2*b* may be movable in the longitudinal direction only, which are not illustrated. Moreover, the lateral guide portion may be provided only, and the front-side battery B2*a* and the rear-side battery B2*b* may be movable in the lateral direction only, which are not illustrated. In a case where the front-side battery B2*a* and the rear-side battery B2*b* are configured to be movable in the lateral direction only, the guide portion is configured to comprise a fixed rail which is fixed to the floor panel 10 and extends in the vehicle width direction and a movable member which is guided in the vehicle width direction by this fixed rail in a state of engaging with this fixed rail, and the front-side battery B2*a* and the rear-side battery B2*b* are fixed to this movable member.

As shown in FIG. 7, the moving mechanism 91 comprises a longitudinal drive portion 91*a*, a front-side lateral drive portion 91*b*, and a rear-side lateral drive portion 91*c*. The longitudinal drive portion 91*a*, the front-side lateral drive portion 91*b*, and the rear-side lateral drive portion 91*c* are configured by a direct-move actuator, such as an electromotive screw mechanism, respectively. The longitudinal drive portion 91*a* is the one to drive the movable member 100*b* of the longitudinal guide portion 100 in the longitudinal direction. The front-side lateral drive portion 91*b* is the one to drive the front-side movable member 101*b* of the front-side lateral guide portion 101 in the lateral direction. The rear-side lateral drive portion 91*c* is the one to drive the rear-side movable member 102*b* of the rear-side lateral guide portion 102 in the lateral direction.

The load detection sensor 92 is the one to detect a load applied to the driver's seat 40 by the passenger seated in the driver's seat 40. Specifically, that can be configured by a pressure sensor installed in the cushion portion 41 of the driver's seat 40 or the like. When the driver is seated in the driver's seat 40, the load related to the weight of the driver is applied downward to the load detection sensor 92. This load is detected by the load detection sensor 92, so that the driver's weight can be assumed.

The control unit 93 is configured by a microcomputer or the like, which is operated by a previously-memorized program. The control unit 93 comprises a calculation portion 93*a* and a drive control portion 93*b*. The calculation portion 93*a* is the one to obtain the load detected by the load detection sensor 92 and calculate respective target positions of the batteries B2*a*, B2*b* based on the obtained load. In a case where the target position is calculated, the weight of the batteries B2*a*, B2*b* are considered as well, for example. For example, the target position is calculated such that the larger the load detected by the load detection sensor 92 is, the further the target positions of the batteries B2*a*, B2*b* are away from the driver's seat 40 in the lateral direction. On the contrary, the target position is calculated such that the smaller the load detected by the load detection sensor 92 is, the closer the target positions of the batteries B2*a*, B2*b* are to the driver's seat 40 in the lateral direction. Thereby, the lateral weight balance of the vehicle body can be improved.

Further, the target position is calculated such that the larger the load detected by the load detection sensor 92 is, the further the target positions of the batteries B2*a*, B2*b* are away from the driver's seat 40 in the longitudinal direction. On the contrary, the target position is calculated such that the smaller the load detected by the load detection sensor 92 is, the closer the target positions of the batteries B2*a*, B2*b* are to the driver's seat 40 in the longitudinal direction. Thereby, the longitudinal weight balance of the vehicle body can be improved.

The drive control portion 93*b* is the one to control the longitudinal drive portion 91*a*, the front-side lateral drive portion 91*b*, and the rear-side lateral drive portion 91*c*, and this portion 93*b* moves the batteries B2*a*, B2*b* so that the batteries B2*a*, B2*b* can be located at the target positions calculated by the calculation portion 93*a*. In a case where the batteries B2*a*, B2*b* are moved in the longitudinal direction, the longitudinal drive portion 91*a* is controlled by the drive control portion 93*b*, so that the batteries B2*a*, B2*b* can be moved to the target positions, in the longitudinal direction, thereof. In a case where the front-side battery B2*a* is moved in the lateral direction, the front-side lateral drive portion 91*b* is controlled by the drive control portion 93*b*, so that the front-side battery B2*a* can be moved to the target position, in the lateral direction, thereof. In a case where the rear-side battery B2*b* is moved in the lateral direction, the rear-side lateral drive portion 91*c* is controlled by the drive control portion 93*b*, so that the rear-side battery B2*b* can be moved to the target position, in the lateral direction, thereof.

Further, the weight of the batteries B2*a*, B2*b* can be used for driver's adjustment of the weight balance of the vehicle body. For example, a position adjusting switch (not illustrated) is provided, and when the driver inputs the target positions of the batteries B2*a*, B2*b* by means of the position adjusting switch, the target positions are set as the target positions of the batteries B2*a*, B2*b* and then inputted to the drive control portion 93*b*. The drive control portion 93*b* controls the longitudinal drive portion 91*a*, the front-side lateral drive portion 91*b*, and the rear-side lateral drive portion 91*c* as described above, thereby arranging the batteries B2*a*, B2*b* at the positions inputted by the driver.

The control unit 93 may indicate the above-described target positions as the best (most appropriate) positions of the batteries B2*a*, B2*b* on a monitor 200 which is provided in the cabin R3. This monitor 200 is disposed at a console or inside a meter panel, for example. The target positions of the batteries B2*a*, B2*b* which are calculated by the calculation portion 93*a* are transformed by the control unit 93 as indication data, and the indication data is outputted to the monitor 200. Thus, the target positions of the batteries B2*a*, B2*b* are indicated on the monitor 200, so that the driver or the like can be informed thereof. The indication manner on the monitor 200 is not limited to this in particular. For example, it may be indicated how far the target positions is from their current positions and in which direction the batteries B2*a*, B2*b* need to be moved. Alternatively, the distance difference between the target positions and the current positions of the batteries B2*a*, B2*b* may be indicated.

(Modification of Battery-Moving Device)

Figure 9:
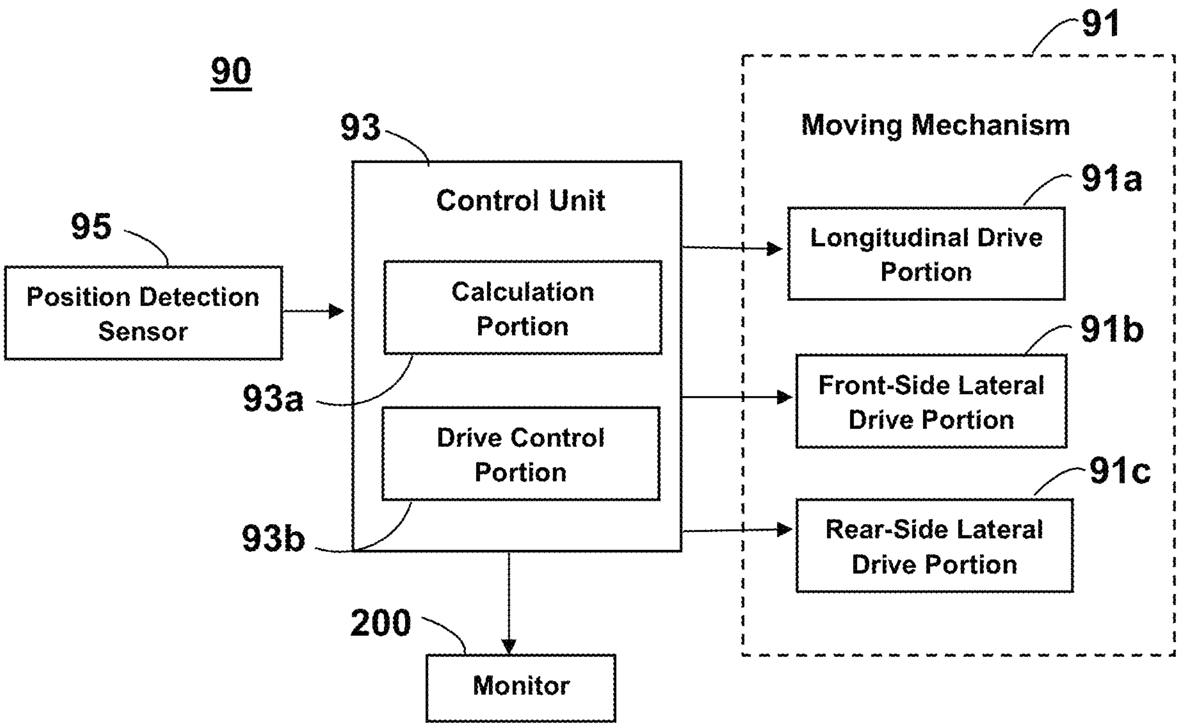
FIG. 9 is a block diagram according to a modification, which corresponds to FIG. 7.

FIG. 9 is a block diagram of a modification of the battery-moving device 90. In this modification, a position detection sensor 95 (shown in FIG. 3 as well) to detect the position, in the longitudinal direction, of the driver's seat 40 is provided. The position detection sensor 95 can be provided with a slide mechanism 43 or the like, for example, which can obtain the longitudinal position of the driver's seat 40 by detecting a moving quality of the slide mechanism 43 or the like. The calculation portion 93*a* calculates the target positions of the batteries B2*a*, B2*b* based on the position detected by the position detection sensor 95. The moving mechanism 91 moves the batteries B2*a*, B2*b* so that these B2*a*, B2*b* can be arranged at the target positions calculated by the calculation portion 93*a*.

Effects of Embodiment

As described above, the vehicle-body structure A of the electric automobile 1 according to the present embodiment comprises the assistant-driver's-seat side battery unit BY2, and this unit BY2 is the heavy abject because of supplying the electric power to the motor M. By moving the assistant-driver's-seat side battery unit BY2 as the heavy object in the longitudinal direction and/or in the vehicle width direction by means of the battery-moving device 90, the adjustment of the longitudinal weight balance or the lateral weight balance of the vehicle is enabled. It becomes possible by this adjustment to properly set the weight balance depending on existence or non-existence of the passenger seated in the assistant driver's seat 30, the weight of the driver seated in the driver's seat 40, or the like. Moreover, achieving of the driver's own preference regarding the steering characteristics, setting of the weight balance according to the traveling road's condition, or the like become possible as well.

The above-described embodiment just shows an exemplified sample of the present invention, and therefore the present invention should not be construed based on this embodiment. Any modification or change is applicable within the scope of the claims of the present invention. For example, either one of the rear-right side battery unit BY3 and the rear-left battery unit BY4 may be provided only. The motor M may be disposed on the left side or on the right side of the vehicle body. The motor M may be arranged such that its output shaft M1 extends in the vehicle width direction. The center battery B1 may be omitted.

Moreover, while the assistant-driver's-seat side battery unit BY2 is automatically moved by the battery-moving device 90 in the above-described embodiment, the driver may move the assistant-driver's-seat side battery unit BY2 manually. In this case, an operational member, such as a manual lever, is provided at the battery-moving device 90, and the assistant-driver's-seat side battery unit BY2 can be moved in the longitudinal direction and/or in the vehicle width direction by operating this operational member. The assistant-driver's-seat side battery unit BY2 is fixed after its moving.

Additionally, in a case where the assistant driver's seat 30 is slidable in the longitudinal direction, by connecting the assistant-driver's-seat side battery unit BY2 to the assistant driver's seat 30, the assistant-driver's-seat side battery unit BY2 can be moved in the longitudinal direction together with the assistant driver's seat 30. Herein, the battery-moving device 90 is configured by the assistant driver's seat 30 which is slidable in the longitudinal direction.

As described above, the present invention is usable for the electric automobile in which the motor for drive and the battery are installed.

What is claimed is:

1. An electric automobile, in which a driver's seat and an assistant driver's seat are provided in line in a vehicle width direction, comprising:
- an assistant-driver's-seat side battery installed on a vehicle forward side of the assistant driver's seat;
- a motor operative to drive a driving wheel when receiving supply of electric power from the assistant-driver's-seat side battery; and
- a battery-moving device to move the assistant-driver's-seat side battery in a vehicle longitudinal direction and/or in the vehicle width direction.

2. The electric automobile of claim 1, further comprising a tunnel portion provided at a central portion, in the vehicle width direction, of a floor panel, protruding upward, and extending in the vehicle longitudinal direction and a center battery installed in said tunnel portion and operative to supply the electric power of said motor.

3. The electric automobile of claim 2, wherein said floor panel forms a floor face of a cabin, the electric automobile further comprises a dash panel rising from a front-end portion of the floor panel and forming a front wall of the cabin and an inclined panel extending obliquely upward-and-rearward from a rear-end portion of the floor panel, a front-end portion of said tunnel portion is connected to said dash panel and a rear-end portion of said tunnel portion is connected to said inclined panel, said motor is provided in the tunnel portion and below the inclined panel, said center battery is installed in the tunnel portion and between the motor and the dash panel, said battery-moving device comprises a rail fixed to the floor panel and extending in the vehicle longitudinal direction or in the vehicle width direction and a movable member guided by said fixed rail in a state of engaging with the fixed rail, and said assistant-driver's-seat side battery is attached to said movable member.

4. The electric automobile of claim 3, wherein said battery-moving device comprises a load detection sensor to detect a load applied to the driver's seat by a passenger seated in the driver's seat, a calculation portion to calculate a target position of said assistant-driver's-seat side battery based on the load detected by said load detection sensor, and a moving mechanism to move the assistant-driver's-seat side battery such that the assistant-driver's-seat side battery is located at the target position calculated by said calculation portion.

5. The electric automobile of claim 3, wherein said battery-moving device comprises a position detection sensor to detect a position, in the vehicle longitudinal direction, of the driver's seat, a calculation portion to calculate a target position of said assistant-driver's-seat side battery based on the position detected by said position detection sensor, and a moving mechanism to move the assistant-driver's-seat side battery such that the assistant-driver's-seat side battery is located at the target position calculated by said calculation portion.

6. The electric automobile of claim 1, wherein said battery-moving device comprises a load detection sensor to detect a load applied to the driver's seat by a passenger seated in the driver's seat, a calculation portion to calculate a target position of said assistant-driver's-seat side battery based on the load detected by said load detection sensor, and a moving mechanism to move the assistant-driver's-seat side battery such that the assistant-driver's-seat side battery is located at the target position calculated by said calculation portion.

7. The electric automobile of claim 1, wherein said battery-moving device comprises a position detection sensor to detect a position, in the vehicle longitudinal direction, of the driver's seat, a calculation portion to calculate a target position of said assistant-driver's-seat side battery based on the position detected by said position detection sensor, and a moving mechanism to move the assistant-driver's-seat side battery such that the assistant-driver's-seat side battery is located at the target position calculated by said calculation portion.

8. The electric automobile of claim 1, wherein said battery-moving device comprises a rail fixed to a floor panel and extending in the vehicle longitudinal direction or in the vehicle width direction and a movable member guided by said fixed rail in a state of engaging with the fixed rail, and said assistant-driver's-seat side battery is attached to said movable member.

9. The electric automobile of claim 8, wherein an upper-end portion of said assistant-driver's-seat side battery is located at a lower level than an upper face of a front-end portion of a cushion portion of the assistant driver's seat.

* * * * *